Patented Aug. 11, 1936

2,050,513

UNITED STATES PATENT OFFICE 2,050,513

SEPARATION OF ONE OR MORE COMPONENTS FROM AN AQUEOUS MIXTURE

Adrianus Johannes Van Peski, Bussum, and Wilhelm C. Brezesinska Smithuysen, Amsterdam, Netherlands, assignors to Shell Development Company, San Francisco, Calif., a corporation of Delaware No Drawing. Application November 25, 1932, Serial No. 644,326. In the Netherlands December 2, 1931

17 Claims. (Cl. 202—42)

For the separation of one or more components from a mixture of various liquids, of late, progressive use is being made of azeotropic distillation, contingently under pressure, which distillation can be either intermittent or continuous.

If, for instance, it is desired to remove the water from an aqueous solution of an organic compound as alcohol, acid, ester and the like, alcohol being selected in its exemplary sense only, the mixture is subjected to a distillation after the addition of a so-called auxiliary liquid, whereby a mixture of water, alcohol and auxiliary liquid distills over as an azeotrope, which may be regarded as a ternary azeotrope or as a mixture of binary and ternary azeotropes, and alcohol remains behind in a water-free or substantially water-free condition.

According to the prior art, if it is desired to prepare a water-free organic compound, as anhydrous alcohol, the alcohol-water mixture to be separated is introduced at a suitable point of a distilling column. The auxiliary liquid is led in at the top of the column. When distilling, if the components are present in an appropriate proportion, all the water, the auxiliary liquid and a small part of the alcohol are withdrawn at the top of the column in the gaseous phase. This ternary azeotrope or mixture of azeotropes is thereafter condensed so that two liquid phases are formed in the separator or decanter. Thereupon each of these phases is subjected to a special treatment in order to isolate the auxiliary liquid and alcohol which are led back respectively to the top of the distilling column and to a special point between the bottom and top of the column. In this known process, special attention is paid to the fact that in the separator the best possible separation in phases takes place.

According to the present invention, it has been ascertained that a more favorable working up in every respect of the azeotrope or mixture of azeotropes is possible. This is attained by subjection of the azeotrope or mixture of azeotropes, obtained by the distillation operation, to a treatment with a suitable absorption agent for the more or less complete separation of one or more components from the other components of the azeotrope or azeotropes.

The azeotrope, originating from the distilling column, in the process according to the invention, can be led, as a whole, to an extraction apparatus, after an ordinary condensation. As already observed, in the processes known thus far the azeotrope is submitted to such a condensation that a complete separation is obtained, after which each phase is separately subjected to a special treatment for the separation of one or more components from the other components. By treating, according to the invention, the azeotrope in its entirety with a suitable absorption agent, a considerably simpler process is obtained as compared with known processes. This is due to the fact that the extraction treatment can take place in a single apparatus, whilst the removal of the component or components taken up by the absorption agent can be carried out by an ordinary distillation without any rectification.

The extraction can be carried out with the azeotrope or azeotropes in gaseous or liquid phase. No special cooling means are necessary when the liquid phase is resorted to. However, if the azeotrope or azeotropes are utilized in the gaseous phase, it is more or less essential that cooling means be located in or about the extraction vessel to compensate for the heat absorbed in vaporizing the aqueous mixtures and/or the extraction agent may be subcooled to the required degree and employed in suitable quantity.

As an alternative, separation prior to extraction may be resorted to without departing from the invention. The pase containing the organic compound and auxiliary liquid, since it contains the greater proportion of valuable components, may be separately subjected to the extraction treatment in accordance with the invention.

In the process according to the invention, the extraction treatment can take place with the aid of an extraction liquid having the property of more or less completely dissolving the liquid functioning as an auxiliary liquid in the azeotropic distillation. Use may also be made of an extraction agent in which one or more other components are taken up instead of the auxiliary liquid. The method to be followed depends on the circumstances.

It is highly recommendable, with a view to selecting the absorption agent to be used, to take into account that the boiling temperature of said liquid should differ from that or those of the component or components to be extracted so that a subsequent separation may easily be effected by a single distillation. It is self-evident that the absorption agent should have a sufficiently great dissolving capacity for the substances to be extracted; be thermally sufficiently stable; whilst the non-extractable constituents of the azeotropic mixture should be insoluble or nearly so in the absorption agent which in its turn should be insoluble or nearly so in the said constituents.

For the removal of, for example, water from isoprpyl alcohol by azeotropic distillation with the aid of benzol, ethylene chloride, benzine, etc. as auxiliary liquids—paraffinum liquidum, kerosene, Edeleanu extract of spindle oil and similar high-boiling organic liquids may be used as the azeotrope-extracting agents for dissolving the auxiliary liquid.

According to the invention, the extraction of the azeotropic mixture obtained in the distillation of isopropyl alcohol, water and benzol, may be carried out as follows:

If the main dehydrating column is in regular operation, at the top of this column a mixture of water, isopropyl alcohol and benzol leaves in the gaseous phase. The composition of this mixture is: 18.7% by weight of isopropyl alcohol, 73.8% by weight of benzol and 7.5% by weight of water. This mixture is led into a continuous extraction apparatus in which it is washed out with paraffinum liquidum in counter current. The relative quantities of azeotropic mixture and paraffinum liquidum are taken in the proportions of about 575.5 vol. azeotropic mixture against about 360 vol. paraffinum liquidum. On one side, an aqueous mixture containing approximately 50% by volume of alcohol with traces of benzol leaves the extraction apparatus and on the other side a liquid consisting of the added paraffinum liquidum, substantially the entire quantity of benzol and approximately 70% by volume of the alcohol originally present in the azeotropic mixture as well as a trace of water. The said liquid is then led to a single distilling apparatus from which a mixture of 18% by volume of alcohol, 81.5% by volume of benzol and 0.5% by volume of water is distilled off. This mixture may, if desired, be led directly back to the dehydrating column as reflux or feed, preferably as reflux. As a residue of the last distillation which, though single, is carried out preferably continuously, remains the paraffinum liquidum used for the extraction and which still contains approximately 9% by volume of benzol. This residue may immediately be used again for a further extraction. The auxiliary liquid and the alcohol which are isolated from the azeotropic mixture, may, if desired, be maintained as a predetermined circulating body.

The process according to the invention is, of course, not restricted to the dehydration of alcohol-water mixtures but it is generally applicable also to the separation of systems consisting of more than two components. Further, more than one auxiliary liquid may be used, whilst the mixture to be split up may originally contain the auxiliary liquid. If this liquid is not present in a sufficient proportion, an additional amount may be added to the mixture.

The auxiliary agent may, in certain cases, be introduced in the gaseous state into the aqueous mixture undergoing distillation. That is, instead of vaporizing an auxiliary liquid in the distilling column, it may be first vaporized outside thereof by any suitable means and then introduced into the column. By this means one can resort to auxiliary agents which possess relatively low boiling temperatures as the hydrocarbons such as butane, pentane and the like.

We claim as our invention:

1. A process for the separation of one or more components from an aqueous organic mixture consisting of a plurality of components, comprising: subjecting said aqueous mixture to azeotropic distillation in the presence of an auxiliary agent, and subjecting the azeotropic mixture obtained thereby to an extraction treatment with a non-aqueous liquid whereby the aqueous content is substantially completely separated from the other components of the azeotropic mixture.

2. A process for the separation of one or more components from an aqueous organic mixture consisting of a plurality of components, comprising: subjecting said aqueous mixture to azeotropic distillation in the presence of an auxiliary agent, condensing the azeotropic mixture thus obtained, and subjecting said liquid azeotropic mixture in its entirety to an extraction treatment with a non-aqueous liquid whereby the aqueous content is substantially completely separated from the other components of the azeotropic mixture.

3. A process for the separation of one or more components from an aqueous organic mixture consisting of a plurality of components, comprising: subjecting said aqueous mixture to azeotropic distillation in the presence of an auxiliary agent and subjecting the azeotropic mixture while in the gaseous phase and in its entirety to an extraction treatment whereby the aqueous content is substantially completely separated from the other components of the azeotropic mixture.

4. A process for the separation of one or more components from an aqueous organic mixture consisting of a plurality of components, comprising: subjecting said aqueous mixture to azeotropic distillation in the presence of an auxiliary agent, condensing the azeotropic mixture thus obtained whereby stratification results and subjecting the separated organic phase to an extraction treatment with a liquid solvent which differs from any one of the components of the mixture whereby the aqueous content is substantially completely separated from the other components of said phase.

5. A process for the separation of one or more components from an aqueous organic mixture consisting of a plurality of components, comprising: subjecting said aqueous mixture to azeotropic distillation in the presence of an auxiliary agent and subjecting the azeotropic mixture thus obtained to an extraction treatment with a non-aqueous absorption liquid whose boiling temperature differs substantially from the boiling temperature of the component or components to be extracted.

6. A process for the separation of one or more components from an aqueous organic mixture consisting of a plurality of components, comprising: subjecting said aqueous mixture to azeotropic distillation in the presence of an auxiliary agent, and subjecting the azeotropic mixture thus obtained in its entirety to an extraction treatment with a high-boiling organic liquid which exerts a preferential selective action for at least one of the components of the azeotropic mixture.

7. A process for the separation of one or more components from an aqueous organic mixture consisting of a plurality of components, comprising: subjecting said aqueous mixture to azeotropic distillation in the presence of an auxiliary agent, condensing and stratifying the resulting azeotropic mixture and subjecting the organic phase thereof to an extraction treatment with a high-boiling organic liquid which exerts a preferential selective action for at least one of the components of the azeotropic mixture contained in said organic phase.

8. A process for the separation of water from an aqueous mixture of an alcohol, comprising: subjecting said aqueous mixture to azeotropic distillation in the presence of an auxiliary agent, and subjecting the resulting azeotropic mixture of water, alcohol and auxiliary agent to an extraction treatment with a high-boiling organic liquid which exerts a preferential selective action for at least the auxiliary agent but not for the water.

9. A process for the separation of water from an aqueous mixture of an alcohol, comprising: subjecting said aqueous mixture to azeotropic distillation in the presence of an auxiliary agent, and subjecting the resulting azeotropic mixture of water, alcohol and auxiliary agent in its entirety to an extraction treatment with a high-boiling organic liquid which exerts a preferential selective action for at least the auxiliary agent but not for the water.

10. A process for the separation of water from an aqueous mixture of an alcohol, comprising: subjecting said aqueous mixture to azeotropic distillation in the presence of an auxiliary agent, condensing and stratifying the resulting azeotropic mixture and subjecting the alcoholic phase thereof to an extraction treatment with a high-boiling organic liquid which exerts a preferential selective action for at least the auxiliary agent but not for the water.

11. A process for the separation of one or more components from an aqueous organic mixture consisting of a plurality of components, which comprises subjecting said aqueous mixture to azeotropic distillation in the presence of an auxiliary agent, and subjecting the azeotropic mixture obtained thereby to an extraction treatment with a liquid substantially immiscible with water whereby the aqueous content is substantially completely separated from the other components of the aqueous mixture.

12. A process for the separation of one or more components from an aqueous organic mixture consisting of a plurality of components which comprises subjecting said aqueous mixture to azeotropic distillation in the presence of an auxiliary agent and subjecting the azeotropic mixture obtained thereby in its entirety to an extraction treatment with a liquid solvent which differs from any one of the components of the mixture whereby the aqueous content is substantially completely separated from the other components of the azeotropic mixture.

13. A process for the separation of one or more components from an aqueous organic mixture consisting of a plurality of components which comprises subjecting said aqueous mixture to azeotropic distillation in the presence of an auxiliary agent and subjecting the azeotropic mixture obtained thereby to an extraction treatment with a liquid substantially miscible with the auxiliary agent, whereby the aqueous content is substantially completely separated from the other components of the azeotropic mixture.

14. A process for the separation of one or more components from an aqueous organic mixture consisting of a plurality of components which comprises subjecting said aqueous mixture to azeotropic distillation in the presence of an auxiliary agent condensing and stratifying the azeotropic mixture obtained into an organic phase and an aqueous phase and subjecting the stratified organic phase to an extraction treatment with a liquid substantially miscible with at least one of the azeotropic components, the boiling temperature of said liquid substantially differing from that of the component or components to be extracted.

15. A process for the separation of one or more components from an organic liquid mixture consisting of a plurality of components which comprises subjecting said organic liquid mixture to azeotropic distillation in the presence of an auxiliary agent and subjecting the azeotropic mixture obtained thereby to an extraction treatment with a liquid substantially miscible with at least one of the azeotropic components, said solvent liquid possessing a boiling temperature different from that of water.

16. A process for the separation of one or more components from an organic liquid mixture consisting of a plurality of components which comprises subjecting said organic liquid mixture to azeotropic distillation in the presence of an auxiliary agent and subjecting the azeotropic mixture obtained thereby to an extraction treatment with an organic liquid substantially miscible with at least one of the azeotropic components.

17. A process from the separation of water from an aqueous mixture of an alcohol, comprising: subjecting said aqueous mixture to an azeotropic distillation in the presence of an auxiliary agent, and subjecting the resulting azeotropic mixture of water, alcohol and auxiliary agent in its entirety to an extraction treatment with a high-boiling organic liquid which exerts a preferential selective action for at least the auxiliary agent but not for the water which differs in properties from the alcohol and auxiliary agent.

ADRIANUS JOHANNES VAN PESKI.
WILHELM C. BREZESINSKA SMITHUYSEN.